US006182182B1

(12) United States Patent
Bradley et al.

(10) Patent No.: US 6,182,182 B1
(45) Date of Patent: Jan. 30, 2001

(54) INTELLIGENT INPUT/OUTPUT TARGET DEVICE COMMUNICATION AND EXCEPTION HANDLING

(75) Inventors: Mark W. Bradley, Boulder, CO (US); Paul J. VonStamwitz, Mountain View, CA (US); Kyle D. Sterling, Pleasanton, CA (US); Chidambara Rameshkumar, Fremont, CA (US)

(73) Assignee: Adaptec, Inc., Milpitas, CA (US)

( * ) Notice: Under 35 U.S.C. 154(b), the term of this patent shall be extended for 0 days.

(21) Appl. No.: 09/181,712

(22) Filed: Oct. 28, 1998

(51) Int. Cl.$^7$ .................................................. G06F 13/38
(52) U.S. Cl. ....................... 710/129; 710/100; 710/130; 710/128
(58) Field of Search ................................... 710/100, 129, 710/130, 128

(56) References Cited

U.S. PATENT DOCUMENTS

| | | | |
|---|---|---|---|
| 5,734,847 | 3/1998 | Garbus et al. | 710/128 |
| 5,751,975 | 5/1998 | Gillespie et al. | 710/126 |
| 5,790,804 | * 8/1998 | Osborne | 709/245 |
| 5,925,099 | * 7/1999 | Futral et al. | 709/204 |
| 5,987,555 | * 11/1999 | Alzien et al. | 710/129 |
| 6,085,274 | * 7/2000 | Seeman | 710/129 |

OTHER PUBLICATIONS

Unknown, "Questions and Answers", I$_2$O SIG Questions and Answers, pp. 1–5, Oct. 28, 1999, www.i2osig.org/abouti2o/QandA99.html.
Unknown, "I/O Processors, See How It Works", Oct. 4, 1998, www.intel.com/design/iio/howworks.html.
Unknown, "ASUS PCI–DA2100 PCI to SCSI Disk Array Controller", User's Manual, 11–96, Rev. 1.22, ©ASUSTeK Computer, Inc.
Unknown, "Welcom to the I$_2$O SIG Web Site!", Oct. 5, 1998, www.12osig.org/.
Unknown, "I$_2$O Questions and Answers", p. 1–4, Oct. 5, 1998, www.12osig.org/Architecture/QandA98.html.
Unknown, "I$_2$O Technology Background", p. 1–6, Oct. 5, 1998, www.i2osig.org/Architecture/TechBack98.html.
Unknown, "Technology Background", Oct. 28, 1999, I$_2$O Technology Backgrounder, pp. 1–7, www.i2osig.org/abouti2o/TechBack99.html.
Unknown, I$_2$O SIG Membership Roster, Oct. 28, 1999, 4 pages, www.i2osig.org/newsite99/membership/Members99.html.
Unknown, "The PC as Enterprise–Class Server", I$_2$O SIG Organization Background, Oct. 28, 1999, www.i2osig.org/aboutsig99/background99.html.

* cited by examiner

Primary Examiner—Thomas C. Lee
Assistant Examiner—Tammara Peyton
(74) Attorney, Agent, or Firm—Martine Penilla & Kim, LLP

(57) ABSTRACT

Disclosed is a computer implemented system, method and computer readable media for facilitating intelligent input/output (I$_2$O) message communication between a host computer system and a silicon specific target device without implementing an input/output processor. The system is thus configured to make generic storage silicon appear as though it were an I$_2$O capable device, without implementing an I/O processor and associated hardware. The system includes a block storage operating system module (OSM) for receiving a request from an operating system of the host computer system and generating an intelligent input/output message request. Also included is a host-resident intermediate service module driver (e.g., a RAID driver) for translating the intelligent input/output message request into a silicon specific request that is compatible with the silicon specific target device. Further included is a queue for holding the silicon specific request until the silicon specific target device pulls the silicon specific request from the queue via a PCI interface transport. In this implementation, the system also includes an exception handling operating system module (EOSM) driver that is in communication with the silicon specific target device and the block storage operating system module for efficiently handling event exceptions.

33 Claims, 3 Drawing Sheets

INTELLIGENT INPUT/OUTPUT TARGET DEVICE COMMUNICATION AND EXCEPTION HANDLING

BACKGROUND OF THE INVENTION

1. Field of the Invention

This invention relates generally to communication between host computer systems and peripheral devices, and more particularly to methods for efficiently communicating with target devices and exception handling in the Intelligent Input/Output ($I_2O$) architecture environment.

2. Description of the Related Art

In an effort to make computer systems more flexible and better able to expand their functionality, many types of well known computer peripheral devices and software drivers have been developed over the years. For example, peripheral devices may either be internal to a computer system's housing, or be external stand-alone devices. Typical internal peripheral devices include hard disk drives, optical disc drives and the like. Most commonly, external peripheral devices are connected to a computer system via a suitable host adapter card. The host adapter card is typically connected to the host computer system via an internal bus or an external connection providing similar functionality.

The host adapter generally has its own hardware to enable communication to and from the peripheral device. The peripheral devices, in turn, are specific to a particular type of communication protocol. One common type of protocol is the SCSI protocol, which enable many types of high speed SCSI peripheral devices to communicate data to and from the host computer. Although computer systems have been gaining additional uses, functionality and modularity, these added features do have the downside of placing a burden on the host computer's CPU.

As a result, microprocessor vendors, such as Intel Corporation of Santa Clara, Calif., have developed specialty I/O processors that are configured to offload some of the processing burden from the CPU of the host computer. Although the host computer has been spared of some processing responsibilities by implementing these specialty microprocessors, adding this type of additional hardware does have the downside of increasing the cost of an overall system.

To facilitate discussion, FIG. 1 illustrates a prior art interface between a host computer system 100 and a peripheral device 118. The simplified architecture of FIG. 1 is commonly used to implement the intelligent I/O ($I_2O$) architecture communication specification, which was jointly developed by several computer vendors, and is currently available from The $I_2O$ Special Interest Group (SIG) of San Francisco, Calif. The $I_2O$ Specification is hereby incorporated by reference in its entirety. The $I_2O$ specification, in general, defines a standard architecture that is independent of the device being controlled. Thus, implementing the $I_2O$ architecture has the power of enabling developers to design cross-platform intelligent I/O devices and software drivers. Accordingly, device manufacturers only need to write a single $I_2O$-ready driver for each device, irrespective of the operating system that will ultimately communicate with the $I_2O$ device driver. Each operating system vender (OSV) must write their own drivers for storage, for LAN, etc.

The $I_2$ O architecture is designed to work in conjunction with an input/output processor 106. The input/output processor 106 generally communicates across a PCI interface 104, to communicate with a block storage operating system module (OSM) 102. The block storage OSM 102 is configured to communicate $I_2O$ message requests to the I/O processor 106, which is then configured to implement a real-time operating system (OS) 108 to execute a device driver 110 (i.e., the target device having a target ID "TID").

The device driver 110 then communicates with a desired SCSI chip 116, for example, via a signal 112. The signal 112 represents the desired request that may be made to the SCSI chip 116 and thus communicated to the peripheral device 118. By way of example, in the case of peripheral storage devices, the request provided through signal 112 may be a request to read a certain number of data blocks from the peripheral storage device 118. Once the desired data has been read from the peripheral storage device 118, the data may be transferred to memory and a reply signal 114 may be provided back to the device driver 110, indicating that a successful data transfer has occurred (or alternatively, indicating that some type of error occurred). The device driver 110 is therefore a logical entity that responds as a target ID (TID). In general, the input/output processor 106 uses the real-time OS 108 to operate on the device driver 110 and communicate with the SCSI chip 116 without utilizing the host computer's processor. For more information on I/O processor functionality, reference may be made to U.S. Pat. Nos. 5,751,975 and 5,734,847, both of which are hereby incorporated by reference.

Although implementing an input/output processor 106 and associated hardware will enable proper handling of $I_2O$ messaging from the block storage OSM 102, this implementation has the downside of significantly increasing the cost of implementing the $I_2O$ architecture messaging scheme to simply effectuate communication with the target device driver 110. Therefore, when $I_2O$ architecture messaging is desired, a user of a computer system will be required not only to purchase, for example, the correct SCSI host adapter card, but also to purchase a specialty input/output processor 106 and associated hardware. As mentioned above, implementing this amount of added hardware has the downside of increasing the total package cost of communicating with peripheral devices.

In spite of the fact that earlier generation computer systems lacked sufficient processor power to handle additional processing tasks, as processor speeds in common computer systems have continued to increase, the need for auxiliary processors is diminishing. That is, the added processing needed to communicate $I_2O$ messages from a host computer system to a target device no longer places such a great processing burden on the processor of the host computer system.

In view of the foregoing, there is a need for a computer implemented method and system that will enable $I_2O$ architecture messaging and exception handling between a host computer system and a target device, without unnecessarily increasing a system's cost by requiring specialty processors.

SUMMARY OF THE INVENTION

Broadly speaking, the present invention fills these needs by providing a method and system for employing an intelligent I/O pull architecture for messaging that implements a host-resident hardware interface service module (such as a RAID driver) and an exception operating system module (EOSM) driver for exception handling. This novel method and system advantageously makes generic storage silicon appear and function as an $I_2O$ ready capable device without a microprocessor. It should be appreciated that the present invention can be implemented in numerous ways, including as a process, an apparatus, a system, a device, a method, or a computer readable medium. Several inventive embodiments of the present invention are described below.

In one embodiment, a method for intelligent input/output message communication between a host computer and a target device is disclosed. The method includes generating an intelligent input/output message request intended for the target device, and pulling the intelligent input/output message request (from a block storage OSM, for example). Translating the intelligent input/output message request into a silicon specific message request (is one function performed by 204). The translating is performed by a host-resident intermediate service module, such as a RAID driver. The method then proceeds to store the silicon specific message request into a first queue, and pull the silicon specific message request from the first queue via a PCI interface for processing by the target device. The method is then configured to push a message reply from the target device to the first queue via the PCI interface, such that the host-resident intermediate service module can translate the message reply that may be in the form of a silicon specific reply into an intelligent input/output message reply. The method then pushes the intelligent input/output message reply to a block storage operating system module for communication to a host operating system (OS).

Still further, the disclosed method is configured to monitor the intelligent input/output message request, such that the monitoring is performed by an exception operating system module (OSM) driver. The silicon stores a copy of the intelligent input/output message request in a second queue (e.g., an internal queue) while a determination is made as to whether the intelligent input/output message reply was received successfully by the block storage operating system module. If the reply was not received successfully, the exception operating system module driver is configured to intervene to correct the problem and then provide the appropriate reply to the block storage operating system module.

In another embodiment, a computer implemented system for facilitating intelligent input/output message communication between a host computer system and a silicon specific target device without implementing an input/output processor is disclosed. The system includes a block storage operating system module for receiving a request from an operating system of the host computer system and generating an intelligent input/output message request. Also included is a host-resident intermediate service module (HISM) driver for translating the intelligent input/output message request into a silicon specific request (e.g., a modified $I_2O$ message, an FFI message, a SCB message, etc.) that is compatible with the silicon specific target device (i.e., understood by the silicon circuitry and firmware). Further included is a queue for holding the silicon specific request until the silicon specific target device pulls the silicon specific request from the queue via a PCI interface transport. In this preferred embodiment, the system further includes an exception operating system module driver that is in communication with the silicon specific target device and the block storage operating system module.

In yet a further embodiment, a system for facilitating I/O processor-less $I_2O$ message communication between a host computer and a silicon specific target device is disclosed. The system includes a block storage operating system module (OSM) that is configured to communicate with an operating system (OS) of the host computer such that the block storage operating system module receives OS-specific I/O requests that are processed into $I_2O$ message requests.

The system further includes a host-resident intermediate service module (HISM) that is configured to pull the $I_2O$ message requests from the block storage operating system module and translate them into a silicon-specific format. Further included is a queue for temporarily storing the $I_2O$ message requests that are in the silicon-specific format. The system then includes a silicon-specific target device that is configured to pull the $I_2O$ message requests that are in the silicon-specific format from the queue and then process a reply. In this preferred embodiment, the system also includes an exception operating system module (OSM) driver that is in communication with the silicon-specific target device and the block storage operating system. The exception operating system module driver is preferably configured to observe the $I_2O$ message requests and store a copy of the $I_2O$ message requests for facilitating trouble shooting if necessary.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a computer implemented method and system for employing intelligent I/O pull transport for messaging that implements a host-resident hardware interface service module and an exception operating system module driver for exception and error handling. This novel method and system advantageously makes non-$I_2O$ storage silicon appear as though it were an $I_2O$ capable device, without implementing cost increasing I/O processors. It will be obvious, however, to one skilled in the art, that the present invention may be practiced without some or all of these specific details. In other instances, well known process operations have not been described in detail in order not to unnecessarily obscure the present invention.

The details of the invention will now be described in greater detail with reference to FIGS. 2–3. By employing an intelligent I/O pull transport for messaging in conjunction with a host resident intermediate service module (ISM) (e.g., such as host resident RAID service module) and an exception handling OSM, non-$I_2O$ silicon can be made to appear as a RAID capable $I_2O$ device. In this manner, there is no need to implement a separate I/O processor, real-time OS, and associated hardware to make generic silicon act as though it were I$_2$O capable. In a preferred embodiment, exceptions will be treated as events for which the exception handling OSM has knowledge of (i.e., are registered exception events). Of particular significance is that the RAID service module is resident on the host resident, as opposed to prior art I/O processor (IOP) implementations which implement device drivers on the other side of the PCI interface as RAID drivers within a runtime OS (RTOS).

Figure 1:
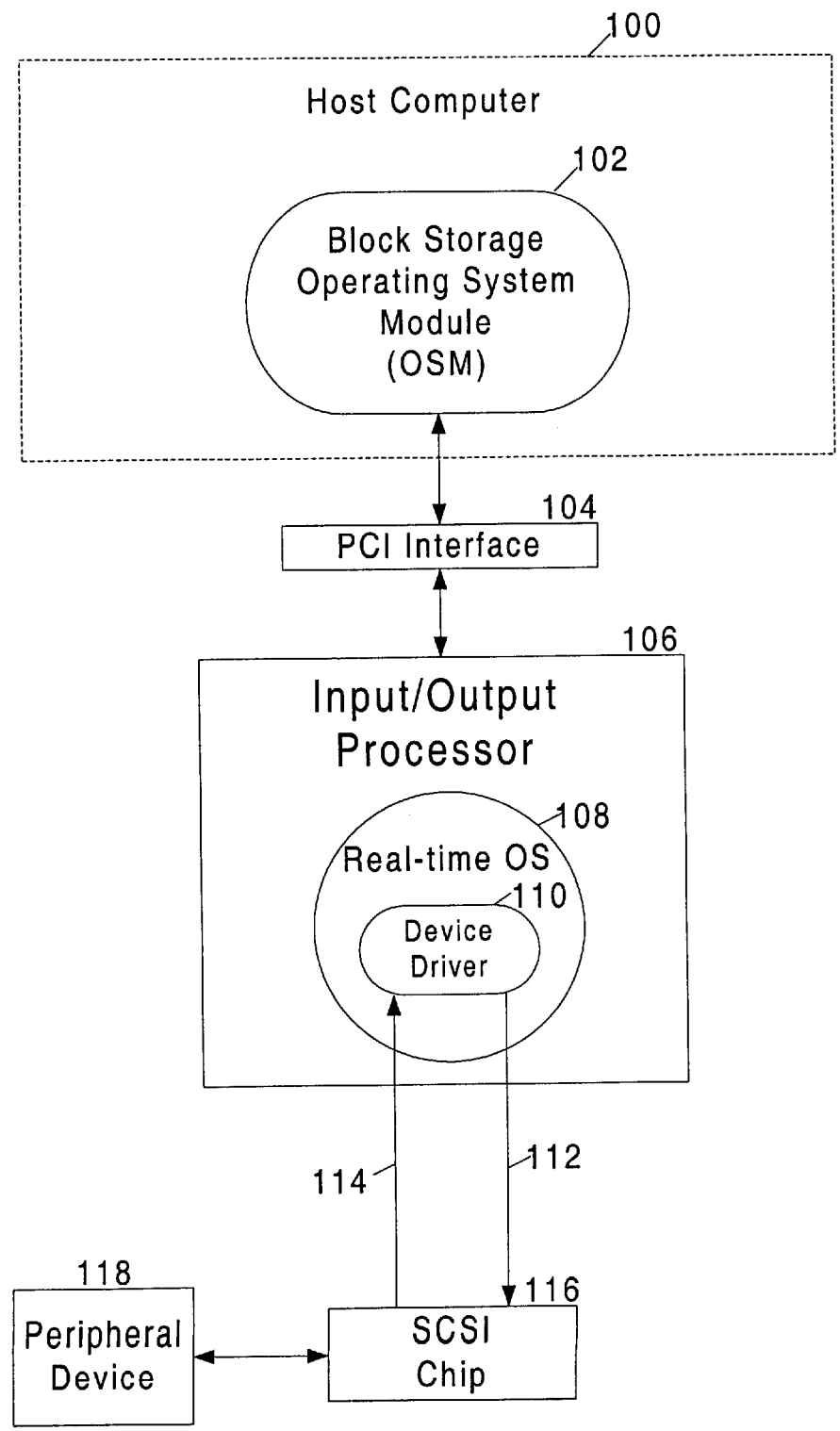
FIG. 1 illustrates a prior art interface between a host computer system and a peripheral device, which implements an I/O processor to execute a device driver within a real-time OS.
Figure 2:
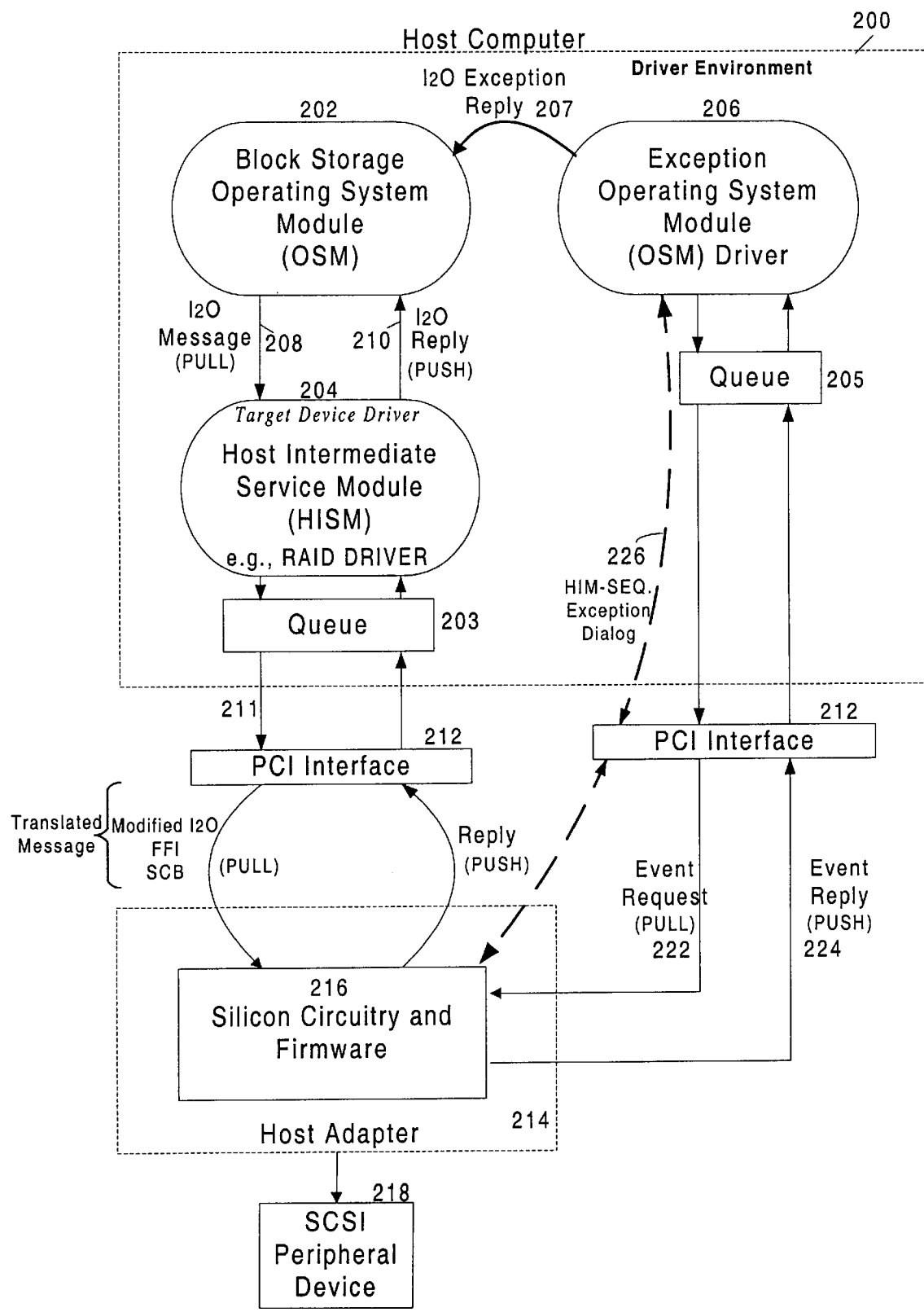
FIG. 2 illustrates an improved $I_2O$ architecture messaging method that streamlines the messaging functionality while eliminating unnecessary I/O processors and associated hardware, in accordance with one embodiment of the present invention.

FIG. 2 illustrates an improved I$_2$O architecture messaging method and system that streamlines the messaging functionality while eliminating unnecessary add-on I/O processors and associated hardware, in accordance with one embodiment of the present invention. As shown, the host computer 200 will generally include a block storage operating system module (OSM) 202 a host intermediate service module (HISM) 204, which functions as the target device for pulling any I$_2$O message from the block storage OSM 202, and communicating a successful reply. Generally, when the OSM 202 is presented with a request from the host OS, it translates the request into the appropriate I$_2$O message before it is dispatched to the HISM 204.

The HISM 204 is, in one embodiment, a RAID driver which is configured to implement an I$_2$O message pull technique to acquire the I$_2$O messages 208 from the host's memory, and generate an I$_2$O push reply 210 back to the host memory. The HISM 204 is configured to write the I$_2$O message into a queue 203 which is configured to communicate over a PCI interface 212 (i.e., a PCI bus), which defines the transport layer interface to a silicon circuitry and firmware module 216. In this embodiment, the silicon circuitry and firmware module 216 is essentially the circuitry, in the form of a silicon chip, that is integrated as part of the host adapter 214. The host adapter 214 is thus capable of communicating with a SCSI peripheral device 218. Although a greater number of peripheral devices may be implemented, only one SCSI peripheral device 218 is provided here to simplify the discussion.

In this embodiment, the queue 203 and the queue 205 are preferably configured to queue data in accordance with an endless queue technique, which is described in greater detail in U.S. patent application Ser. Nos.: (1) 08/862,143, filed May 22, 1997, having inventor Arlen Young, (2) 08/815,645, filed Mar. 13, 1997, having inventor Arlen Young, and (3) 08/816,980, filed Mar. 13, 1997, having inventor Arlen Young. These U.S. patent applications, which are commonly assigned to the assignee of the present application, are hereby incorporated by reference.

The exception OSM driver 206 is shown in communication with the silicon circuitry and firmware module 216 via an event request signal 222 and an event reply signal 224. Also shown is a hardware interface module (HSM)—sequencer exception dialog signal 226, which communicates between the silicon circuitry and firmware module 216 and the exception OSM driver 206. As will be discussed in greater detail below, the exception OSM driver 206 is also capable of communicating with the block storage OSM 202 via a signal 207. During normal operation, the block storage OSM 202 is configured to send I$_2$O messages via signal 208 to the target device HISM 204.

The target device HISM 204 is thus configured to parse the I$_2$O message and perform an appropriate conversion in order for the silicon circuitry and firmware module 216 to be sent the request in interface calls specific to the silicon. For example, if the silicon circuitry and firmware module 216 only understands certain silicon-specific interface calls, the I$_2$O message received from the block storage OSM 202 will be translated into the appropriate silicon-specific interface call. These silicon-specific interface call can thus be transferred to the queue 203 and then via signal 211 over the PCI interface 212, which is then communicated to the silicon circuitry and firmware module 216.

Alternatively, the target device HISM 204 may convert the I$_2$O message 208 (depending upon the type of silicon circuitry and firmware module 216 being implemented), into one of a modified I$_2$O message, a fixed function interface (FFI) of the I$_2$O architecture, or a SCSI command block (SCB). By way of example, when the target device HISM 204 merely provides a modified I$_2$O message, the I$_2$O message may simply be converted from one that identifies logical drives with redundancy characteristics (e.g., in the case of a RAID implementation), to one directly associated with a particular physical device.

Accordingly, the target device HISM 204 is configured to parse through the I$_2$O message request received via signal line 208 and appropriately translate it to a form that is best suited to be understood by the silicon circuitry and firmware module 216 being implemented. Additionally, the target device HISM 204 is able to interface more efficiently with the block storage OSM 202 because it is situated on the host computer side of the PCI interface 212, as opposed to the prior art, which has the target device on the other side of the PCI interface and significant latency-increasing logic. This provides a significant improvement in performance and thus, the I$_2$O messages will be more expeditiously and efficiently handled as opposed to the prior art technique of implementing an auxiliary processor that is physically coupled on the other side of the PCI interface.

Assuming that the block storage OSM 202 generated an I$_2$O message that was configured to request reading of data from the SCSI peripheral device 218 (i.e., a hard disk drive or the like), that I$_2$O message would be communicated to the target device 204 HISM and then communicated to the silicon circuitry and firmware module 216 in accordance with the proper translation scheme. The silicon circuitry and firmware would then process the message and provide the appropriate reply back through the PCI interface 212 to the target device HISM 204. Generally, the reply that is generated from the silicon circuitry and firmware module 216 will be produced after the silicon and firmware appropriately respond with the data and that data is properly stored in a suitable memory location. Such data storing operation can be accomplished through the use of any memory access protocol, and one such exemplary protocol is a well known direct memory access (DMA) data transfer.

Typically, the silicon circuitry and firmware module 216 will have the appropriate sequencers and firmware to operate on the I$_2$O message requests received from the target device HISM 204. However, there are situations where the silicon circuitry and firmware module 216 are incapable of processing the request for one reason or another. When this occurs, a successful reply will not be generated and subsequently transferred back to the PCI interface 212 by the silicon circuitry and firmware module 216. To handle such a situation, the exception operating system module (EOSM) driver 206 is configured to handle any such errors implementing the following exception handling algorithm.

In this embodiment, each time the block storage OSM 202 generates an I$_2$O message request to the target device 204, the exception OSM driver 206 will be configured to read the request via a communication 222 that implements a pull technique. If an error occurs in the processing by silicon circuitry and firmware module 216, the exception OSM driver 206 using the request signal 222, will be able to observe the I₂O message request and simultaneously cache a copy of that request in a queue 205.

If an event error occurs during the processing of the request by the silicon circuitry and firmware module 216, the exception OSM driver 206, which is designed to generally be in idle state to preserve processing overhead, will wake up and respond by receiving the event reply 224 from the silicon and firmware module 216, provided that the exception OSM driver 206 has this type of error registered and will execute the appropriate software strategy routines to handle such an error. As will be described below in table A, the exception OSM driver 206 will preferably have all I₂O specific detailed status codes registered for the type of silicon. Other chip-specific error codes may also be registered in a like manner.

At this point, a hardware interface module (HIM)-sequence exception dialog 226 communication will be established between the exception OSM driver 206 and the silicon circuitry and firmware module 216. This interface is in essence, a fully enabled software interface, and not just a register level interface. In this manner, the HIM-sequence exception dialog can function in conjunction with the exception OSM driver to troubleshoot the problem or event error experienced by the silicon circuitry and firmware module 216.

If possible, the exception OSM driver will attempt to fix the detected error associated with the processing by the silicon circuitry and firmware module 216, and then generate an I₂O exception (e.g., backup) reply via 207 back to the block storage OSM 202. In this manner, the exception OSM driver 206 is therefore set up to step in and troubleshoot any errors that may occur in the processing of the request by the silicon circuitry and firmware module 216, and then generate a proper I₂O exception reply to the block storage OSM 202. This I₂O exception reply is therefore configured to substitute the I₂O reply that would have been provided by signal 210 if the error had not occurred. However, when an error does occur, the normal I₂O reply via signal 210 will typically not be possible.

Advantageously, the exception OSM driver 206 is well suited to step in and complete the reply to the block storage OSM 202 without disrupting the functionality between the host computer and the target device. A further advantageous feature is that the exception OSM driver 206 is generally in an idle state during most of the time I₂O communications are being exchanged, and very little host processor overhead is consumed by the exception OSM driver 206.

In most circumstances, proper communication between the block storage OSM 202, the target device 204 and ultimately, with the desired peripheral device, will operate very lean on host processor overhead. However, in those cases where an error occurs, the exception OSM driver 206 will swiftly move in to determine what the error may have been, attempt to repair the error if possible, and then provide the proper I₂O reply to the block storage OSM 202. In some cases, the I₂O exception reply provided by the exception OSM driver 206 will be a reply that indicates completion with error or retry occurred. In other cases, the reply will simply indicate that an error occurred and that the error could not be remedied.

Figure 3:
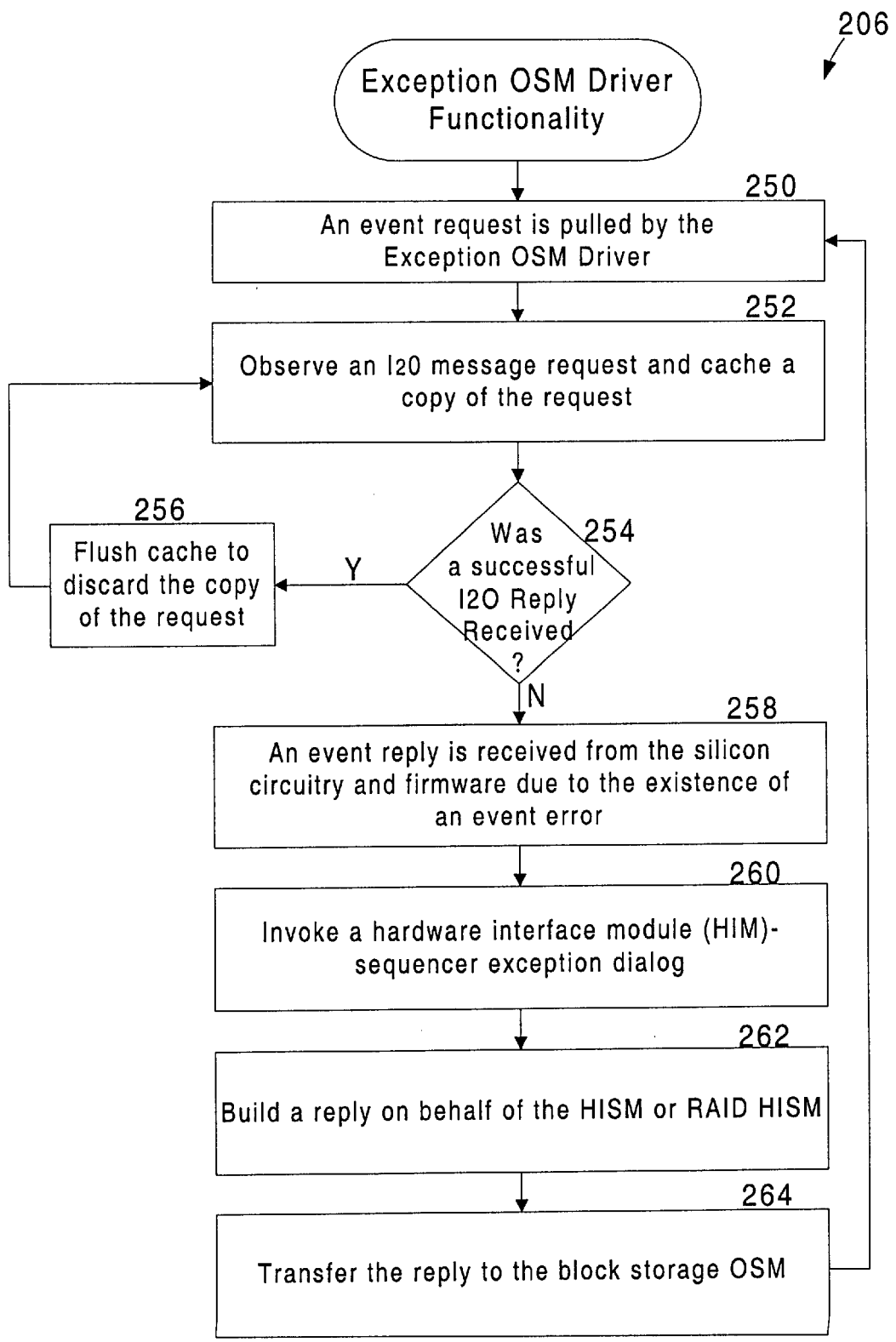
FIG. 3 illustrates a more detailed flowchart diagram of the method operations performed by an exception operating system module (OSM) driver in accordance with one embodiment of the present invention.

FIG. 3 illustrates a more detailed flowchart diagram of the method operations performed by the exception operating system module (OSM) driver 206 in accordance with one embodiment of the present invention. Initially, an event notification request is generated by the exception OSM driver in operation 250. Once the exception OSM driver has generated the event request, the method will proceed to an operation 252 where the I₂O message request generated by the block storage OSM 202 is observed and a copy of the request is cached in a suitable memory location.

The method now proceeds to a decision operation 254 where it is determined whether a successful I₂O reply has been received by the block storage OSM 202 from the silicon circuitry and firmware module 216. If it is determined that a successful I₂O reply is successfully received, the method will proceed to an operation 256 where the cache memory is cleared to discard the copy of the request. The method will then proceed back to operation 252 where the next I₂O request message is observed and cached in memory. If it is determined that a successful I₂O reply was not received, the method will proceed to an operation 258 where an event reply is received from the silicon circuitry and firmware due to the existence of an error event.

Upon receiving notice of the error event, the method will proceed to an operation 260 where a hardware interface module (HIM)-sequencer exception dialog is invoked. The hardware interface module-sequencer exception dialog is configured to perform hardware-specific diagnostics at a low level in order to determine the source of the exception error and attempt to correct the problem. In general, the HIM-sequencer exception dialog is well suited to perform, for example, register level writes and reads in order to ascertain the source of the problem, perform error correction, or the like. If the problem is determined to be one that can be corrected, the HIM-sequencer exception dialog will attempt to repair the error condition.

In operation, detailed status codes, such as those status codes in table A, are provided by the exception OSM driver 206 to signal the error using a reply via signal 207.

EXAMPLE DETAILED STATUS CODES

TABLE A

| | |
|---|---|
| _SUCCESS | Normal completion without reportable errors. |
| _BAD_KEY | The specified key was not recognized or invalid. (Applies only to operations on table groups). |
| _CHAIN_BUFFER_TOO_LARGE | The SGL Chain Buffer is too large to be processed. |
| _DEVICE_BUSY | Device os busy with another operation and its request queue is full. |
| _DEVICE_NOT_AVAILABLE | Device cannot be accessed via this target device ID (TID). |
| _DEVICE_RESET | Resource reset-not available until UtilResetAck received. |
| _INAPPROPRIATE_FUNCTION | This function is not valid for this class or sub-class. |
| _INVALID_INITIATOR_ADDRESS | Invalid Initiator Address. |
| _INVALID_MESSAGE_FLAGS | Invalid MessageFlags field value. |
| _INVALID_OFFSET | Invalid SGL/TRL offset value in message header. |
| _INVALID_TARGET_ADDRESS | Invalid TargetAddress. |
| _MESSAGE_TOO_LARGE | Message too large-MessageSize specifies a value larger than the message frame. |
| _MISSING_PARAMETER | Missing parameter. |
| _REPLY_BUFFER_FULL | The reply overflowed the reply buffer (or reply message frame). The reply buffer contains data generated up to the point of overflow. |

TABLE A-continued

| | |
|---|---|
| _Bus_ERROR | Problem detected with the operation of the device's bus, operation completed with successful retry attempts. RetryCount supplied in. Successful Completion Reply Message. Reading the Error Log provides hardware-specific status. |
| _Bus_FAILURE | The operation failed due to a problem with the device's bus. |
| _DEVICE_FAILURE | Device hard failure. |
| _ILLEGAL_BLOCK_TRANSFER | Attempt to perform a fixed-block request when BlockSize paramet5er of DEVICE_ID group is set to zero. |
| _ILLEGAL_COMPRESSION_CONTROL | Error report condition caused when a TapeCmprsnSet request occurs, when disallowed by device state or tape position. |
| _ILLEGAL_LOAD_OPERATION | Error report condition caused by an attempt to request a load, onload, lock or unlock the device does not support, or is appropriate to the current device state. |
| _MEDIA_ERROR | Media retry. Device was forced to retry to read/write the data. Retry count supplied. GET_LAST_LOGGING_DATA can retrieve hardware-specific status. |
| _MEDIA_FAILURE | The operation failed due to an error on the medium. |
| _POWER_RESET_DETECTED | A power cycle or device/bus reset was detected. |
| _PROTOCOL_FAILURE | The operation failed due to a communication problem with the device. |
| _SUCCESS_WITH_RETRIES | Successful operation: retires required. RetryCount supplied available in Successful Completion Reply Message. |
| _TIMEOUT | The operation failed because the time-out value specified for this request has been exceeded. |
| _WRITE_PROTECTED | The medium is write protected or read only. |

The method will proceed to an operation 262 where a reply on behalf of the block storage OSM is built by the exception OSM driver 206. This reply is essentially an I$_2$O exception reply which will substitute the reply that was intended to be sent back to the block storage OSM if no error had occurred. Once the reply is been properly built in operation 262, the method will proceed to an operation 264 where the reply is transferred to the block storage OSM from the exception OSM driver. Typically, the reply provided by the exception OSM driver to the block storage OSM is one that provides information of whether there was an error in conjunction with the reply being sent, and the type of error that may have been fixed due to any number of well known problems, such as those of table A.

Once the transfer of the I$_2$O exception reply has been provided to the block storage OSM, the method will proceed back up to operation 250 where an event request is generated by the exception OSM driver to begin the method anew. The process will therefore continue during the messaging performed between the host computer OS and the silicon circuitry and firmware module 216. It should be understood that in most cases, the communication link between the block storage OSM 202 and the target device 204 of FIG. 2, will work flawlessly to communicate I$_2$O requests and receive I$_2$O replies to and from the silicon circuitry and firmware module 216.

In essence, the target device 204 is a lean and powerful host intermediate service module (HISM) that can operate as a RAID driver, however, it will not include the additional code for handling exceptions, which is more advantageously handled by the exception OSM driver 206. This therefore, provides for a target device HISM RAID driver that is more efficiently executed during normal operation without the need for cumbersome exception handling software code. At the same time, the exception operating system module (OSM) driver 206 of FIG. 2 will generally lie idle during normal transfers between the block storage OSM 202 and the silicon circuitry and firmware 216. Only when some kind of an error or failure has been detected will the exception OSM driver 206 wake up to handle the necessary exception processing.

As such, the normal I$_2$O message handling will be provided with exceptional performance that is substantially more efficient and faster than a system that incorporates exception handling code that is continually executed. In addition, as mentioned above, the target device host intermediate service module (HISM) RAID driver 204 is capable of handling more efficiently the I$_2$O messaging between the block storage OSM 202, as compared to the prior art which relied on the target device that was integral with the input/output processor 106, that resides on the other side of the PCI interface with respect to the host computer. As such, much more streamlined I$_2$O communication between the host computer and the selected silicon circuitry and firmware module 216 will be provided, without the need for cost increasing I/O processors, real-time OS's and associated hardware.

The invention may employ various computer-implemented operations involving data stored in computer systems to drive computer peripheral devices (i.e., in the form of software drivers). These operations are those requiring physical manipulation of physical and logical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for intelligent input/output message communication between a host computer and a target device, comprising:

generating an intelligent input/output message request intended for the target device;

receiving the intelligent input/output message request;

translating the intelligent input/output message request into a silicon specific message request, the translating being performed by a host-resident intermediate service module;

storing the silicon specific message request into a first queue; and pulling the silicon specific message request from the first queue via a PCI interface for processing by the target device.

2. A method for intelligent input/output message communication between a host computer and a target device as recited in claim 1, further comprising:

pushing a message reply from the target device to the first queue via the PCI interface, such that the host-resident intermediate service module can translate a silicon specific reply into an intelligent input/output message reply; and pushing the intelligent input/output message reply with a commensurate interrupt to a block storage operating system module.

3. A method for intelligent input/output message communication between a host computer and a target device as recited in claim 2, further comprising:

monitoring the intelligent input/output message request, the monitoring being performed by an exception operating system module driver;

storing a copy of the intelligent input/output message request in a second queue; and determining whether the intelligent input/output message reply was received successfully by the block storage operating system module.

4. A method for intelligent input/output message communication between a host computer and a target device as recited in claim 3, further comprising:

if the intelligent input/output message reply was not successful for the block storage operating system module, the exception operating system module driver receives an event reply from the target device; and invoking a hardware interface module-sequencer exception dialog for determining sequencer exceptions associated with the target device and attempting a correction of an error that caused the event reply.

5. A method for intelligent input/output message communication between a host computer and a target device as recited in claim 4, further comprising:

building an exception reply on behalf of the host-resident intermediate service module, the building being performed by the exception operating system module driver; and transferring the exception reply to the block storage operating system module for communication to an operating system of the host computer.

6. A method for intelligent input/output message communication between a host computer and a target device as recited in claim 3, further comprising:

if the intelligent input/output message reply was received successfully by the block storage operating system module, the stored copy of the intelligent input/output message request is discarded from the second queue.

7. A method for intelligent input/output message communication between a host computer and a target device as recited in claim 1, wherein the a silicon specific message request is one of a modified intelligent input/output request, a fixed function interface type request, and a SCSI command block (SCB) type request.

8. A method for intelligent input/output message communication between a host computer and a target device as recited in claim 1, wherein the host-resident intermediate service module is target device driver.

9. A method for intelligent input/output message communication between a host computer and a target device as recited in claim 7, wherein the target device driver is a RAID (redundant array of independent disk) driver.

10. A method for intelligent input/output message communication between a host computer and a target device as recited in claim 1, wherein the target device is a silicon circuit having firmware for generating exception events.

11. A method for intelligent input/output message communication between a host computer and a target device as recited in claim 4, wherein the event reply is one of a set of registered events known by the exception operating system module driver.

12. A method for intelligent input/output message communication between a host computer and a target device as recited in claim 11, further comprising:

configuring the exception operating system module driver to be specific to the target device.

13. A method for intelligent input/output message communication between a host computer and a target device as recited in claim 1, wherein the method is carried out without an input/output processor, and the host-resident intermediate service module is executed by a processor of the host computer system.

14. A method for intelligent input/output message communication between a host computer and a target device as recited in claim 13, wherein the host-resident intermediate service module is a RAID (redundant array of independent disk) driver.

15. A computer implemented system for facilitating intelligent input/output message communication between a host computer system and a silicon specific target device without implementing an input/output processor, the system comprising:

a block storage operating system module for receiving a request from an operating system of the host computer system and generating an intelligent input/output message request;

a host-resident intermediate service module driver for translating the intelligent input/output message request into a silicon specific request that is compatible with the silicon specific target device; and a queue for holding the silicon specific request until the silicon specific target device pulls the silicon specific request from the queue via a PCI interface transport.

16. A computer implemented system for facilitating intelligent input/output message communication between a host computer system and a silicon specific target device without implementing an input/output processor as recited in claim 15, further comprising:

an exception operating system module driver in communication with the silicon specific target device and the block storage operating system module.

17. A computer implemented system for facilitating intelligent input/output message communication between a host computer system and a silicon specific target device without implementing an input/output processor as recited in claim 15, wherein the host-resident intermediate service module driver is configured to receive a reply from the queue that was push delivered to the queue by the silicon specific target device via the PCI interface transport.

18. A computer implemented system for facilitating intelligent input/output message communication between a host computer system and a silicon specific target device without implementing an input/output processor as recited in claim 16, wherein the exception operating system module driver is configured to observe and store a copy of the intelligent input/output message request.

19. A computer implemented system for facilitating intelligent input/output message communication between a host computer system and a silicon specific target device without implementing an input/output processor as recited in claim 18, wherein the exception operating system module driver is further configured to receive a push event reply from the silicon specific target device when an error occurs.

20. A computer implemented system for facilitating intelligent input/output message communication between a host computer system and a silicon specific target device without implementing an input/output processor as recited in claim 19, wherein when the error occurs, the exception operating system module driver is configured to invoke a hardware interface module-sequencer dialog for trouble shooting the error.

21. A computer implemented system for facilitating intelligent input/output message communication between a host computer system and a silicon specific target device without implementing an input/output processor as recited in claim 19, wherein when the error does not occur, the stored copy of the intelligent input/output message request is discarded.

22. A computer implemented system for facilitating intelligent input/output message communication between a host computer system and a silicon specific target device without implementing an input/output processor as recited in claim 16, wherein the host-resident intermediate service module driver is target device driver having an $I_2O$ target ID (TID).

23. A computer implemented system for facilitating intelligent input/output message communication between a host computer system and a silicon specific target device without implementing an input/output processor as recited in claim 22, wherein the target device driver is a redundant array of independent disk (RAID) driver.

24. A computer implemented system for facilitating intelligent input/output message communication between a host computer system and a silicon specific target device without implementing an input/output processor as recited in claim 16, wherein the exception operating system module driver is configured to build an exception reply for the block storage operating system module when an error occurs during processing by the silicon specific target device.

25. A computer implemented system for facilitating intelligent input/output message communication between a host computer system and a silicon specific target device without implementing an input/output processor as recited in claim 16, wherein the silicon specific target device is integrated into a host adapter that is interfaced with a peripheral device.

26. A computer implemented system for facilitating intelligent input/output message communication between a host computer system and a silicon specific target device without implementing an input/output processor as recited in claim 25, wherein the peripheral device is a SCSI device.

27. A system for facilitating I/O processor-less $I_2O$ message communication between a host computer and a silicon specific target device, the system comprising:
 a block storage operating system module configured to communicate with an operating system (OS) of the host computer such that the block storage operating system module receives I/O requests that are processed into $I_2O$ message requests;
 a host-resident intermediate service module being configured to pull the $I_2O$ message requests from the block storage operating system module and translate them into a silicon-specific format;
 a queue for temporarily storing the $I_2O$ message requests that are in the silicon-specific format; and
 a silicon-specific target device configured to pull the $I_2O$ message requests that are in the silicon-specific format from the queue and then process a reply.

28. A system for facilitating I/O processor-less $I_2O$ message communication between a host computer and a silicon specific target device as recited in claim 27, further comprising:
 an exception operating system module driver that is in communication with the silicon-specific target device and the block storage operating system, the exception operating system module driver is configured to observe $I_2O$ message requests and store a copy of the $I_2O$ message requests.

29. A system for facilitating I/O processor-less $I_2O$ message communication between a host computer and a silicon specific target device as recited in claim 28, further comprising:
 a hardware interface module-sequencer dialog for handling trouble shooting of an error experienced by the silicon-specific target device, the trouble shooting configured to perform register level write and read operations to detect and correct the error.

30. A system for facilitating I/O processor-less $I_2O$ message communication between a host computer and a silicon specific target device as recited in claim 29, wherein the exception operating system module driver is configured to generate an exception reply to the block storage operating system module when the error occurs.

31. A system for facilitating I/O processor-less $I_2O$ message communication between a host computer and a silicon specific target device as recited in claim 27, wherein the host-resident intermediate service module is a target device driver that is executed by a processor of the host computer system.

32. A system for facilitating I/O processor-less $I_2O$ message communication between a host computer and a silicon specific target device as recited in claim 31, wherein the target device driver is a RAID driver.

33. A system for facilitating I/O processor-less $I_2O$ message communication between a host computer and a silicon specific target device as recited in claim 31, wherein the silicon-specific format is selected from one of a modified $I_2O$ request format, an $I_2O$ FFI request format, and a SCB format.

* * * * *